INVENTOR
ANTHONY J. KLOSKA
BY David M. Schiller
ATTORNEY

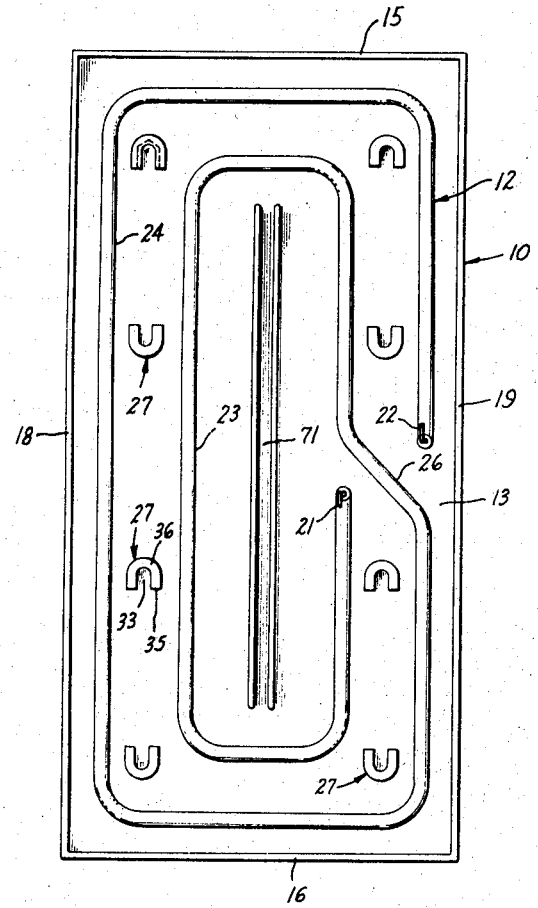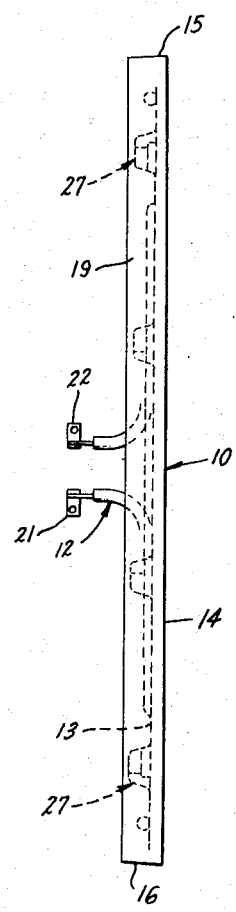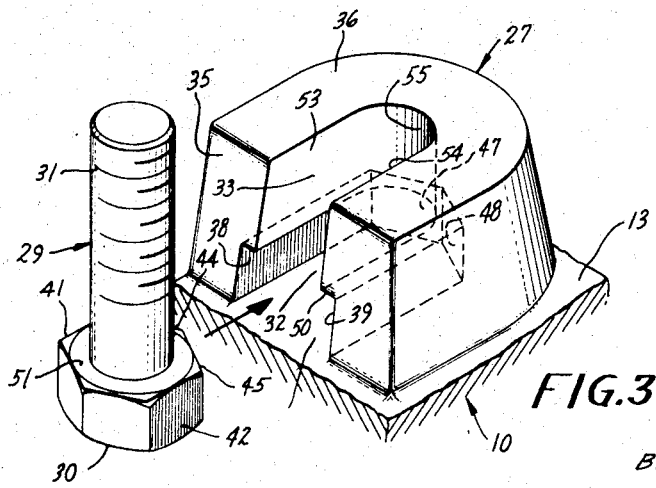
FIG. 1      FIG. 2
FIG. 3
INVENTOR
ANTHONY J. KLOSKA
BY David M. Schiller
ATTORNEY April 15, 1969     A. J. KLOSKA     3,439,152
ELECTRIC SURFACE HEATING ASSEMBLY
Filed Aug. 11, 1967

United States Patent Office 3,439,152
Patented Apr. 15, 1969

3,439,152
ELECTRIC SURFACE HEATING ASSEMBLY
Anthony J. Kloska, Chicago Heights, Ill., assignor to General Electric Company, a corporation of New York
Filed Aug. 11, 1967, Ser. No. 659,939
Int. Cl. H05b 3/06
U.S. Cl. 219—536                                    12 Claims

ABSTRACT OF THE DISCLOSURE

An electric surface heating assembly includes a griddle or hot plate having a plurality of projections depending from its bottom surface configured to releasably captivate bolts which receive nuts to secure a clamping plate against a heating element for sandwiching the heating element between the clamping plate and the griddle. The bolts are installed and removed relative to the projections by lateral movement thereof into and out of side opening passages formed in the projections.

BACKGROUND OF THE INVENTION

Electric surface heating assemblies ordinarily comprise a heat distributing member in the form of a metallic griddle or hot plate with an electric heating element secured to the bottom surface of the griddle to heat the top surface thereof. Various means have heretofore been employed for securing the heating element in position against the bottom surface of the griddle. As one example, Patent 3,130,664 discloses a griddle assembly wherein threaded studs are welded to the griddle to receive nuts which engage brackets employed to clamp the heating element against the griddle bottom. As a further example, Patent 3,245,462 discloses a griddle assembly wherein threaded studs adapted to receive nuts are shot into the griddle by a cartridge fired gun. Another practice has been to form threaded openings in the griddle bottom to receive threaded bolts which when screwed down engage brackets for clamping the heating element against the griddle bottom.

The above-mentioned prior art designs require costly and time consuming operations in their initial assembly due to the special tools and techniques required to install the associated studs or bolts. Moreover, it has been found that the elevated temperatures, which may be as high as 1100° F., to which such surface heating assemblies are subject while in use will usually after a period of time cause seizure of the threaded engagement between a number of the bolts and the griddle or between the studs and nuts, as the case may be, thus preventing unthreading of the engaged parts by relative rotation in the usual manner. Therefore, when it becomes necessary to disassemble the assembly to repair the heating element for example, and seizure has occurred, it is necessary to cut the studs to release the nuts or to cut the bolts, thus destroying the fasteners. Prior to replacing the heating element, the destroyed studs or bolts must be drilled out from the griddle and replacement studs or bolts installed on the griddle by welding or shooting, or retapping the bolt holes, all of which involves very costly and time consuming operations.

OBJECTS OF THE INVENTION

It is accordingly a primary object of the invention to provide a novel and improved electric surface heating assembly of inexpensive design which not only can be quickly and easily assembled in its initial manufacture, but also can be rapidly disassembled and reassembled in the field for servicing even if the associated fasteners are seized, all without the use of costly special tools and techniques.

It is another object of the invention to provide a novel and improved electric surface heating assembly having provision for facilitating installation and removal of fasteners employed to secure the heating element to the griddle or hot plate.

It is a further object of the invention to provide a novel and improved electric surface heating assembly wherein the heating element is secured to the griddle or hot plate by bolt and nut assemblies with the bolts being releasably and captively mounted to permit their installation and removal by simple manual manipulation thereof without the use of costly special tools and techniques.

SUMMARY OF THE INVENTION

In carrying out the invention in one preferred form an electric surface heating assembly includes a heat distributing member comprised of a griddle or hot plate having top and bottom surfaces and a plurality of spaced projections extending from the griddle bottom for releasably and captively retaining a plurality of bolts having threaded portions extending beyond the ends of the projections. Each of the projections includes axially spaced communicating passages opening at a side of the projection and at the end thereof, the passages being configured to releasably receive a bolt and to restrain the received bolt against substantial rotation about its axis and also against substantial axial movement. The associated bolt is readily installed and removed relative to its retaining projection by lateral movement of the bolt through the side opening into and out of the passages. A heating element is positioned against the griddle bottom and a clamping plate overlies the heating element and includes a plurality of openings through which extend the threaded portions of the bolts. A plurality of nuts are threaded onto the bolts to bear against the clamping plate to force the plate against the heating element to thereby sandwich the heating element between the clamping plate and the griddle.

Other objects and advantages of the invention will become apparent from the following description taken in conjunction with the accompanying drawings.

BRIEF DESCRIPTION OF THE DRAWINGS

FIGURE 1 is a view in bottom plan showing a partial electric surface heating assembly including the heat distributing member and the heating element positioned against the bottom surface of the heat distributing member;

FIGURE 2 is a view in side elevation of the assembly of FIGURE 1;

FIGURE 3 is a view in perspective showing one of the retaining projections on the bottom of the heat distributing member and a bolt adapted to be releasably and captively retained by the projection;

DESCRIPTION OF A PREFERRED EMBODIMENT

Figure 4:
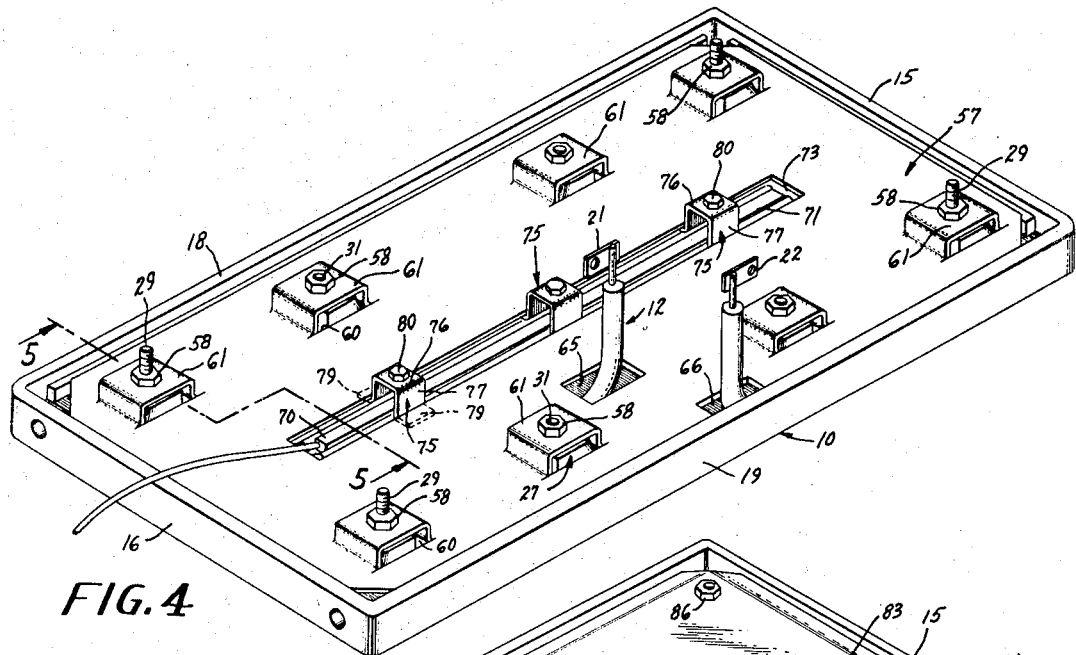
FIGURE 4 is a view in perspective showing the assembly of FIGURE 1 with a clamping plate overlying the heating element and attached to the heat distributing member by the bolt and nut assemblies.

Referring now to the drawing there is illustrated in FIGURE 1 a partial electric surface heating assembly forming the subject of this invention and including a heat distributing member 10 in the form of a griddle or hot plate and an electric heating element 12 in position against the bottom surface 13 of the member 10 which also has a top heating surface 14, the two surfaces 13 and 14 being generally parallel to each other. The member 10 is formed of any suitable heat conducting material and preferably comprises an iron casting of rectangular configuration formed with upstanding end walls 15 and 16 and side walls 18 and 19. The heating element includes a pair of terminals 21 and 22 adapted for connection to a voltage source and as viewed in FIGURE 1, is configured between the terminals to define a pair of outer and inner substantially rectangular sections 23 and 24 connected by a transverse portion 26. While the member 10 and heating element 12 are shown as being of generally rectangular configuration, it is understood that they may have any desired configuration, such as square, circular, etc. The heating element defines substantially a plane which as generally parallel to the bottom surface 13 when the heating element is secured to the member 10.

In accord with the invention provision is made for securing the heating element 12 to the member 10 so as to greatly facilitate not only the initial assembly of the assembly, but also its subsequent disassembly and reassembly for servicing or other purposes. To this end the securing means comprises a plurality of threaded fasteners releasably and captively retained by retaining means on the member 10 configured to permit easy insertion and withdrawal of the fasteners by simple manual manipulation thereof without the use of costly special tools and techniques. In the specific embodiment of the invention illustrated in FIGURES 1 and 3 the retaining means includes a plurality of spaced retaining members 27 mounted in any suitable manner on the bottom of member 10 to releasably receive threaded fasteners 29 by lateral movement of the fasteners. In the preferred form the members 27 comprise projections cast integrally with the member 10 to extend from the bottom surface 13 generally perpendicular thereto beyond the plane defined by the heating element 12 and short of the plane containing the upper edges of the walls 15, 16, 18, and 19 as viewed in FIGURE 5.

The fasteners 29 preferably comprise conventional bolts each having an enlarged hexagonal head 30 and an elongated restricted threaded portion 31. Each bolt is installed and removed relative to its associated projection 27 by movement of the bolt laterally in directions perpendicular to its axis into and out of a pair of communicating axially spaced passages 32 and 33 formed in the projection and opening at a side face 35 and at an end face 36 thereof. The passage 32 has a greater width dimension than the passage 33 and is adjacent the bottom surface 13 of the member 10 to receive the bolt head 30 whereas the more restricted passage 33 receives a part of the threaded portion 31 when the bolt is installed. The passage 32 includes a pair of spaced parallel elongated side walls 38 and 39 spaced by a distance only slightly greater than the distance between opposed flat sections 41 and 42 of the bolt head so as to receive with small clearance the sections 41 and 42 with adjacent flat sections 44 and 45 of the bolt head in engagement respectively with correspondingly angularly related end walls 47 and 48 of the passage 32. The passages 32 and 33 are separated by an intermediate shoulder 50 which is spaced from the bottom surface 13 of the member 10 by a distance slightly greater than the thickness dimension of the bolt head so that when the bolt is installed within the passages, the shoulder 50 closely overlies portions of the undersurface 51 of the bolt head. The passage 33 includes parallel side walls 53 and 54 spaced by a distance slightly greater than the diameter of the threaded portion 31 of the bolt, and a semicircular end wall 55 against which the threaded portion 31 bears when the bolt is installed. With the described arrangement the walls 38, 39, 47, and 48 of the passage 32 restrain the bolt head against substantial rotation about its axis and the shoulder 50 restrains the bolt against substantial axial movement whereby the bolt is releasably and captively retained by the projection 27 with the threaded portion 31 projecting beyond the end face 36 for association with suitable clamping means hereinafter described.

Any suitable number of projections 27 may be employed and in the illustrated embodiment eight such projections are utilized arranged in two parallel rows extending longitudinally of the member 10. The projections are disposed in a rectangular array which surrounds the inner section 23 of the heating element and which is surrounded by the outer section 24 of the heating element. The projections are preferably cast with their side faces 35 facing longitudinally of the member 10 so that the casting core imprint will not interfere with the surface to which the assembly is secured.

Figure 5:
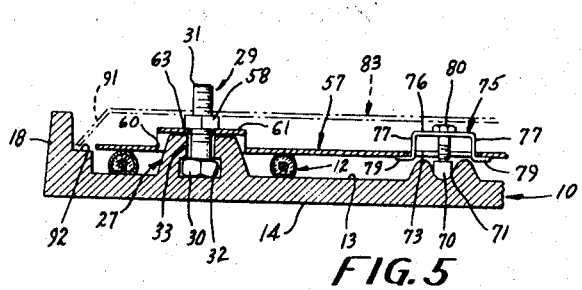
FIGURE 5 is a view in section taken along the lines 5—5 of FIGURE 4.

In order to clamp the heating element 12 to the member 10 suitable clamping means 57 is positioned to overlie the heating element to receive the threaded portions 31 of the bolts which receive threaded nuts 58 to force the clamping means against the heating element to thereby secure the heating element to the member 10. With reference to FIGURES 4 and 5 the clamping means 57 is shown as comprising a generally flat rectangular plate formed with a plurality of spaced enlarged openings 60 through which extend the projections 27 when the clamping plate is operatively positioned as shown in FIGURES 4 and 5. A plurality of bridging members 61 are mounted on the plate 57 in any suitable manner to extend across the openings 60 and contain smaller openings 63 through which extend the threaded portions 31 of the bolts 29. The bridging members 61 preferably are formed integrally with the plate 57 by being struck out of the plane of the plate to define the openings 60. The nuts 58 are threaded on the free ends of the threaded portions 31 to bear against the bridging members 61 to thereby force the clamping plate against the heating element 12 to sandwich the heating element between the clamping plate and the bottom surface of the member 10. The plate 57 includes a pair of openings 65 and 66 through which extend the terminal ends of the heating element 12.

The assembly preferably includes a thermostatic control for maintaining the temperature of the member 10 substantially constant. Such a control includes a temperature responsive element 70 shown in FIGURES 4 and 5 mounted in engagement with the member 10. In order to mount the element 70 the bottom surface 13 of the member 10 is formed with a centrally disposed elongated channel 71 which receives the element 70 and which is aligned with a slightly longer and wider slot 73 formed in the clamping plate 57. In order to firmly secure the element 70 in position a plurality of securing elements 75 are provided each of generally U-shaped configuration having a base 76 and a pair of spaced legs 77 with flanges 79 extending laterally from the ends of the legs. As shown in FIGURES 4 and 5 three securing elements 75 are spaced along the slot 73 each positioned with its base 76 overlying the slot 73 and with its flanges 79 extending beneath the clamping plate 57. Screws 80 extend through threaded openings in the bases 76 with the ends of the screws 80 bearing against the element 70. When the screws 80 are tightened, the flanges 79 are drawn up against the underside of the clamping plate so that the element 70 is firmly secured within the channel 71.

Figure 6:
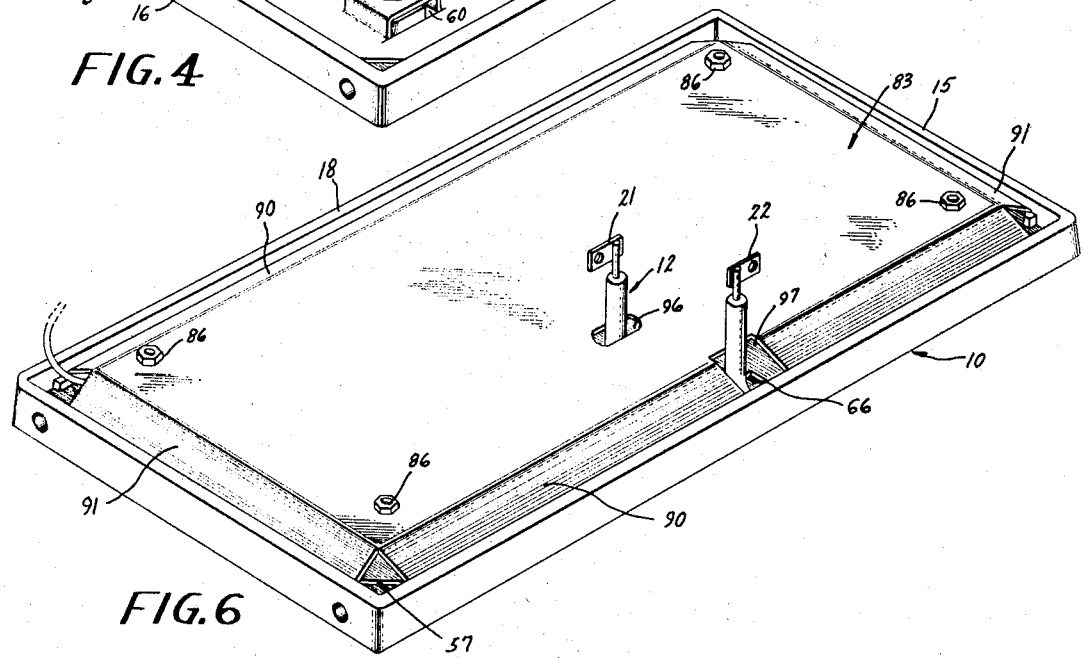
FIGURE 6 is a view in perspective showing the complete assembly comprised of the assembly of FIGURE 4 with a heat baffle overlying the clamping plate and secured in position by bolt and nut assemblies at the four corners.

In order to improve the efficiency of the assembly a metallic heat baffle 83 is preferably employed, and is secured to overlie the clamping plate 57 as shown in FIGURES 5 and 6. To this end certain ones of the bolts 29 have threaded portions which are longer than the threaded portions of the remaining bolts so as to extend through openings of the heat baffle for reception of additional nuts. As illustrated in FIGURES 4 and 6, the four corner bolts 29 have longer threaded portions which project through openings of the baffle 83 for reception of nuts 86 (FIGURE 6) which when tightened secure the baffle to the member 10. The baffle 83 includes downwardly sloping side and end flanges 90 and 91 respectively slightly spaced from ledges 92 (FIGURE 5) on the member 10 so as to minimize the loss of heat generated by the heating element. Suitable openings 96 and 97 are formed in the baffle 83 through which the terminals of the heating element project for connection to a suitable source of voltage to permit energization thereof. It is noted that the plate 57 and the baffle 83 are configured to define spaces at their corners through which conductors from the element 70 can extend.

By means of the invention an electric surface heating assembly is provided which can be very quickly assembled in its initial manufacture, and which can be rapidly disassembled and reassembled for service, all without the use of costly special tools and even in the event that the nuts 58 and 86 and the threaded portions of the bolts 29 have become sized due to prolonged exposure to the high temperatures involved in use. To initially assemble the assembly, the heating element 12, the element 70 and the bolts 29 are installed on the member 10 in no particular order. The bolts are installed by lateral movement thereof in the direction of the arrow in FIGURE 3 into the passages 32 and 33. The elements 75 with their screws 80 are then placed in position. The plate 57 is next placed in position and the nuts 58 are threaded on the bolts. The baffle 83 is thereafter placed over the plate 57 and the nuts are threaded on the four corner bolts. To disassemble the assembly for repair or other purposes, the nuts 86 are unthreaded from the four corner bolts 29 to permit removal of the heat baffle 83. If the nuts 86 have become seized to the bolts, the bolt threads are sawed or chiseled to remove the nuts and associated bolt threads to allow removal of the heat baffle. The nuts 58 are next unthreaded from their associated bolts and the clamping plate 57 removed from the assembly. If the nuts 58 have become seized to their associated bolts, the threaded portions of the bolts are severed to remove the seized nuts and associated bolt threads which permits removal of the clamping plate 57. The elements 75 may then be removed and the heating element 12 as well as the element 70 are now exposed for removal. The remainders of the bolts which have been severed are readily withdrawn from their associated projections 27 by lateral movement thereof out of the passages 32 and 33. Replacement bolts are easily installed by lateral movement thereof in the direction of the arrow shown in FIGURE 3 into the passages 32 and 33. The heating element 12, clamping plate 57, and heat baffle 83 are then reassembled to the member 10 in the reverse order of their disassembly. The initial assembly and the disassembly and reassembly operations are performed rapidly without the use of special tools and time consuming operations previously required with prior art designs.

Although the invention has been described with reference to certain specific embodiments thereof, numerous modifications are possible and it is desired to cover all modifications falling within the spirit and scope of the invention.

What I claim as new and desire to secure by Letters Patent of the United States is:

1. An electric surface heating assembly comprising in combination:
   a heat distributing member having a top heating surface and a bottom surface opposite said top surface,
   an electric heating element adjacent said bottom surface and generally parallel thereto,
   a plurality of fasteners having elongated threaded portions,
   a plurality of spaced retaining means on said heat distributing member adjacent said bottom surface for releasably retaining said fasteners with their threaded portions projecting generally perpendicular to and away from said bottom surface clear of the retaining means and of said bottom surface, each of said retaining means having side and end openings and passage means exposed through said openings, said passage means being configured to mount an associated fastener against substantial rotation about its axis and against substantial axial movement, said openings permitting installation and removal of an associated fastener relative to said passage means by lateral movement of the fastener through said side opening into and out of said passage means in directions transverse to the axis of the fastener,
   clamping means overlying said heating element having openings through which extend the threaded portions of said fasteners, and
   threaded elements in threaded engagement with the threaded portions of said fasteners to force said clamping means against said heating element to thereby secure said heating element to said heat distributing member.

2. An assembly as defined in claim 1 wherein each of said retaining means comprises a retaining member extending from said bottom surface, said passage means comprising a first enlarged passage opening at a side of said retaining member and adjacent said bottom surface and a second narrower passage opening at said side of said retaining member communicating with said first passage and also opening at the end of said retaining member, each of said fasteners having an enlarged polygonal head and a restricted elongated threaded portion and being positioned with its head within said first passage and with its threaded portion within said second passage and projecting beyond the end of said member.

3. An assembly as defined in claim 1 wherein said retaining means comprises projections integral with said heat distributing member extending from said bottom surface, said clamping means comprising a substantially flat plate having a plurality of enlarged openings through which extend said projections, and a plurality of bridging members on the plate extending across said enlarged openings, said bridging members having smaller openings through which extend the threaded portions of said fasteners.

4. An assembly as defined in claim 1 wherein said heat distributing member comprises an iron casting of generally rectangular configuration, said retaining means comprising projections cast integrally with said heat distributing member to extend from said bottom surface and disposed in a generally rectangular array, said heating element being in direct contact with said bottom surface and being configured between its terminals to define a pair of spaced outer and inner substantially rectangular sections, said outer section of said heating element surrounding said projections and said inner section of said heating element being surrounded by said projections.

5. An assembly as defined in claim 1 wherein preselected ones of said fasteners have threaded portions which are longer than the threaded portions of the remaining ones of the fasteners,
   a metallic heat baffle overlying said clamping means and having openings through which extend the threaded portions of said preselected ones of said fasteners, and
   additional threaded elements in threaded engagement with the threaded portions of said preselected ones of said fasteners.

6. An electric surface heating assembly comprising in combination:
   a heat distributing member having a top heating surface and a bottom surface opposite said top surface,
   an electric heating element defining substantially a plane and disposed adjacent said bottom surface generally parallel thereto,
   a plurality of bolts each having an enlarged head and a restricted elongated threaded portion,
   a plurality of spaced projections integral with said heat distributing member depending from said bottom surface for releasably retaining said bolts with their threaded portions projecting generally perpendicular to said bottom surface beyond the ends of the projections, each of said projections extending beyond the plane defined by said heating element and having axially spaced communicating passages opening at a side of and at the end of the projection, said passages having different width dimensions sized to receive respectively said bolt head and said threaded portion with small clearance and being configured to releasably mount an associated bolt against substantial rotation about the bolt axis and against substantial axial movement, and to permit installation and removal of an associated bolt by lateral movement of the bolt through said side opening into and out of said passages in directions transverse to the bolt axis.

a clamping plate overlying said heating element having a plurality of openings through which extend the threaded portions of said bolts, and a plurality of nuts in threaded engagement with the threaded portions of said bolts to force said clamping plate against said heating element to thereby sandwich the heating element between said clamping plate and said heat distributing member.

7. An assembly as defined in claim 6 wherein said clamping plate has a plurality of enlarged openings through which said projections extend, and bridging sections on said clamping plate extending across said enlarged openings and having smaller openings through which the threaded portions of said bolts extend.

8. An assembly as defined in claim 6 wherein said bottom surface includes an elongated channel, said clamping plate having a plurality of enlarged openings through which said projections extend, and also having an elongated centrally disposed slot overlying said channel,
 a temperature responsive element disposed within said channel,
 a plurality of bridging sections on said clamping plate extending across said enlarged openings and having smaller openings through which the threaded portions of said bolts extend,
 a plurality of securing elements each of generally U-shaped configuration having a base and a pair of spaced legs with flanges extending laterally from the ends of the legs and with a threaded hole in the base, each of said securing elements being positioned with its base overlying said elongated slot and with said flanges between said heat distributing member and said clamping plate, and
 a plurality of screws extending through the holes in the bases of said securing members with the ends of said screws bearing against the temperature responsive element disposed within said channel.

9. A heating assembly as defined in claim 6 wherein said clamping plate has a plurality of enlarged openings through which said projections extend,
 bridging sections on said clamping plate extending across said enlarged openings and having smaller openings through which the threaded portions of said bolts extend,
 preselected ones of said bolts having threaded portions which are longer than the threaded portions of the remaining ones of said bolts,
 a metallic heat baffle overlying said clamping plate and having a plurality of openings through which the threaded portions of said preselected ones of said bolts extend, and
 additional nuts in threaded engagement with the threaded portions of said preselected ones of said bolts.

10. An assembly as defined in claim 6 wherein said heat distributing member comprises a cast iron member of generally rectangular configuration, said projections cast integrally with said heat distributing member and disposed in a generally rectangular array, said heating element being in direct contact with said bottom surface and being configured between its terminals to define a pair of spaced outer and inner substantially rectangular sections, said outer section of said heating element surrounding said projections and said inner section of said heating element being surrounded by said projections.

11. An assembly as defined in claim 8 wherein said heat distributing member comprises a cast iron member of generally rectangular configuration, said projections cast integrally with said heat distributing member and disposed in a generally rectangular array, said heating element being in direct contact with said bottom surface and being configured between its terminals to define a pair of spaced outer and inner substantially rectangular sections, said outer section of said heating element surrounding said projections and said inner section of said heating element being surrounded by said projections.

12. An assembly as defined in claim 11 wherein preselected ones of said bolts have threaded portions which are no longer than the threaded portions of the remaining ones of said bolts.
 a metallic heat baffle overlying said clamping plate and having a plurality of openings through which the threaded portions of said preselected ones of said bolts extend, and
 additional nuts in threaded engagement with the threaded portions of said preselected ones of said bolts.

References Cited

UNITED STATES PATENTS

| | | | |
|---|---|---|---|
| 2,913,564 | 11/1959 | Tavender et al. | 219—536 |
| 3,130,664 | 4/1964 | Jarmuth et al. | 219—463 |
| 3,245,462 | 4/1966 | Ramer | 219—463 |

BERNARD A. GILHEANY, *Primary Examiner.*

F. E. BELL, *Assistant Examiner.*

U.S. Cl. X.R.

219—463